United States Patent
Ueda

(10) Patent No.: US 11,570,349 B2
(45) Date of Patent: Jan. 31, 2023

(54) IMAGE PICKUP APPARATUS THAT CONTROLS OPERATIONS BASED ON VOICE, CONTROL METHOD, AND STORAGE MEDIUM

(71) Applicant: CANON KABUSHIKI KAISHA, Tokyo (JP)

(72) Inventor: Kiyoto Ueda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 78 days.

(21) Appl. No.: 17/191,149

(22) Filed: Mar. 3, 2021

(65) Prior Publication Data
US 2021/0289123 A1 Sep. 16, 2021

(30) Foreign Application Priority Data
Mar. 12, 2020 (JP) .............................. JP2020-043327

(51) Int. Cl.
*H04N 5/232* (2006.01)
*G10L 15/22* (2006.01)
*G06F 3/16* (2006.01)
*G10L 25/78* (2013.01)

(52) U.S. Cl.
CPC ......... *H04N 5/23203* (2013.01); *G06F 3/167* (2013.01); *G10L 15/22* (2013.01); *G10L 2015/223* (2013.01); *G10L 2025/783* (2013.01)

(58) Field of Classification Search
CPC ........... H04N 5/23203; H04N 5/23216; H04N 5/23241; H04N 5/23245; H04N 5/232; H04N 5/23218; H04N 5/2251; G06F 3/167; G10L 15/22; G10L 2015/223; G10L 2025/783; G10L 17/24
See application file for complete search history.

(56) References Cited

U.S. PATENT DOCUMENTS
2009/0232471 A1* 9/2009 Komi .................. G11B 27/105
386/326

FOREIGN PATENT DOCUMENTS
JP 2001203974 A * 7/2001
JP 2001203974 A 7/2001

* cited by examiner

*Primary Examiner* — Nelson D. Hernández Hernández
(74) *Attorney, Agent, or Firm* — Rossi, Kimms & McDowell LLP

(57) ABSTRACT

An image pickup apparatus includes an image pickup unit that obtains video, an audio input unit that collects sound and a control unit that controls recording of the video based on a wake word and a control word included in the sound collected by the audio input unit. In a case where the control word that gives an instruction to stop recording the video is included in the sound, the control unit stops recording the video and records video data before a start time of the wake word as a video file.

17 Claims, 10 Drawing Sheets

FIG. 6A

STOP VIDEO RECORDING    AUDIO INPUT SETTINGS

WAKE WORD    | BYE BYE | ~601
STOP VIDEO   | SEE YOU AGAIN | ~602

DO YOU CHANGE VIDEO EDITING SETTING TO THE FOLLOWING?

BEFORE WAKE WORD    ☑ ~604
BEFORE VIDEO STOP WORD    ☐
NOT EDIT    ☐

605 [ YES ]    606 [ NO ]

FIG. 6C

VIDEO EDITING SETTING

BEFORE WAKE WORD    ☑ ~607
BEFORE VIDEO STOP WORD    ☐
NOT EDIT    ☐

VIDEO EDITING METHOD

AUTO DELETE    ☑ ~609
ADD MARKER    ☐

[ OK ] ~610

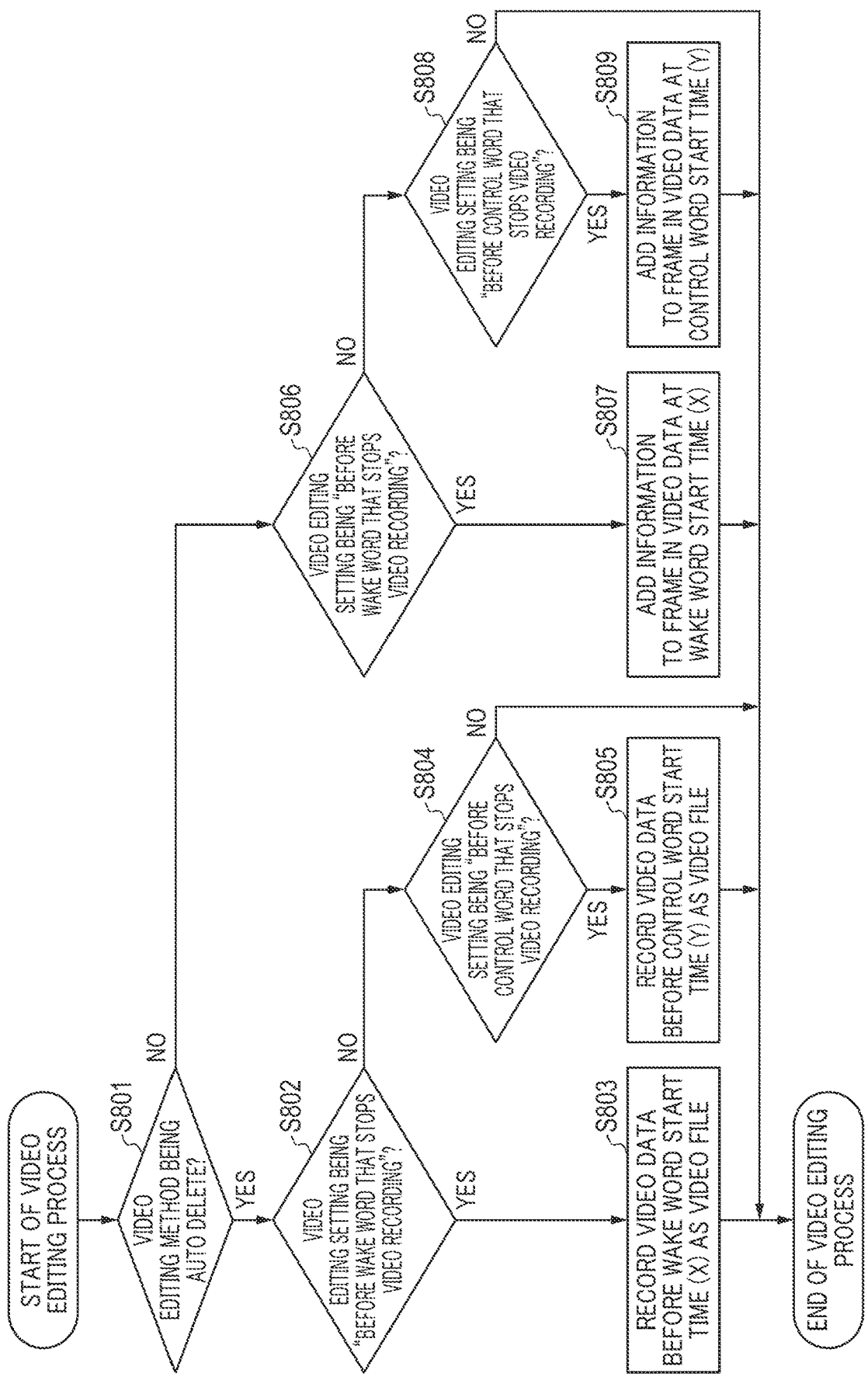

IMAGE PICKUP APPARATUS THAT CONTROLS OPERATIONS BASED ON VOICE, CONTROL METHOD, AND STORAGE MEDIUM

BACKGROUND OF THE INVENTION

Field of the Invention

The present invention relates to an image pickup apparatus that controls operations based on voice, a control method therefor, and a storage medium.

Description of the Related Art

Voice recognition technology has been advancing due to technological innovation of natural language processing (NLP) based on deep learning. Consequently, it has become possible to more accurately recognize voice uttered by users, and the demand for controlling devices with voice input has been growing.

Japanese Laid-Open Patent Publication (Kokai) No. 2001-203974 discloses a technique that prevents a control voice from being recorded on a recording means by rewinding the recording means to a position immediately before a position at which the control voice was input.

In Japanese Laid-Open Patent Publication (Kokai) No. 2001-203974 (in particular, a section relating to rewind control), control based on a control voice that gives an instruction to stop recording is described, but using a plurality of control voices is not expected. For example, in a case where the technology described in Japanese Laid-Open Patent Publication (Kokai) No. 2001-203974 is applied to an arrangement in which a plurality of control voices are present, which control voice should be used as a voice based on which a rewinding process is carried out is not clear from the description in Japanese Laid-Open Patent Publication (Kokai) No. 2001-203974.

SUMMARY OF THE INVENTION

The present invention provides an image pickup apparatus and a control method therefor which are capable of properly removing an unnecessary control voice from video, as well as a storage medium.

Accordingly, the present invention provides an image pickup apparatus including an image pickup unit that obtains video, an audio input unit that collects sound and a control unit that controls recording of the video based on a wake word and a control word included in the sound collected by the audio input unit, wherein in a case where the control word that gives an instruction to stop recording the video is included in the sound, the control unit stops recording the video and records video data before a start time of the wake word as a video file.

Further features of the present invention will become apparent from the following description of exemplary embodiments (with reference to the attached drawings).

BRIEF DESCRIPTION OF THE DRAWINGS

FIGS. 6A to 6D are views useful in explaining examples of setting changing screens in the embodiment of the present invention.

FIG. 8 is a flowchart showing a video editing process in the embodiment of the present invention.

DESCRIPTION OF THE EMBODIMENTS

Figure 1:
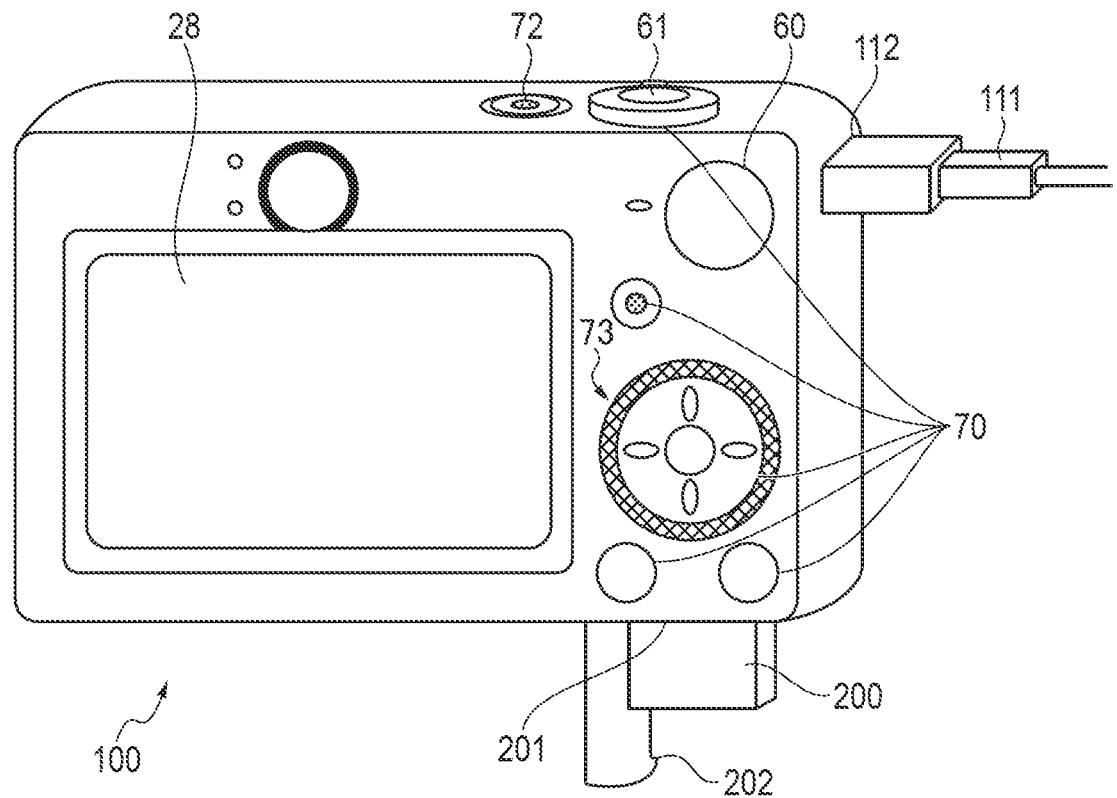
FIG. 1 is an external view of a digital camera which is an example of an image pickup apparatus according to an embodiment of the present invention.

FIG. 1 is an external view of a digital camera 100 which is an example of an image pickup apparatus according to an embodiment of the present invention. The digital camera 100 has a display 28, a mode selector switch 60, a shutter button 61, an operating unit 70, a power switch 72, a controller wheel 73, a connector 112, a recording medium slot 201, and a lid 202.

The display 28 displays picked-up images and various types of information and is comprised of, for example, a liquid crystal display.

The mode selector switch 60 is an operating member that switches between various modes such as a video shooting mode and a still image shooting mode.

The shutter button 61 is an operating member that instructs the digital camera 100 to shoot images such as videos and still images.

The operating unit 70 is an operating member that receives various operations from a user and includes switches, buttons, and a touch panel that is integral with the display 28. The controller wheel 73 is an operating member that receives rotating operations from the user.

The mode selector switch 60, the shutter button 61, the operating unit 70, and the controller wheel 73 constitute an operating unit according to the present embodiment. The operating unit may be comprised of other members.

The power switch 72 is an operating member that switches the digital camera 100 between a power-on state and a power-off state.

The connector 112 is an element that connects the digital camera 100 and a connecting cable 111 together. The connecting cable 111 is an element that connects external devices such as a computer and a printer to the digital camera 100.

The recording medium slot 201 is configured to house a recording medium 200 such as a memory card and a hard disk. The recording medium 200 housed in the recording medium slot 201 is electrically connected to the digital camera 100 via a terminal of the recording medium slot 201 so as to communicate with the digital camera 100. As a result, data can be recorded on and read from the recording medium 200.

The lid 202 is configured to cover the recording medium 200 housed in the recording medium slot 201 when it is closed. In FIG. 1, the lid 202 is open, and a part of the recording medium 200 exposes itself from the recording medium slot 201.

Figure 2:
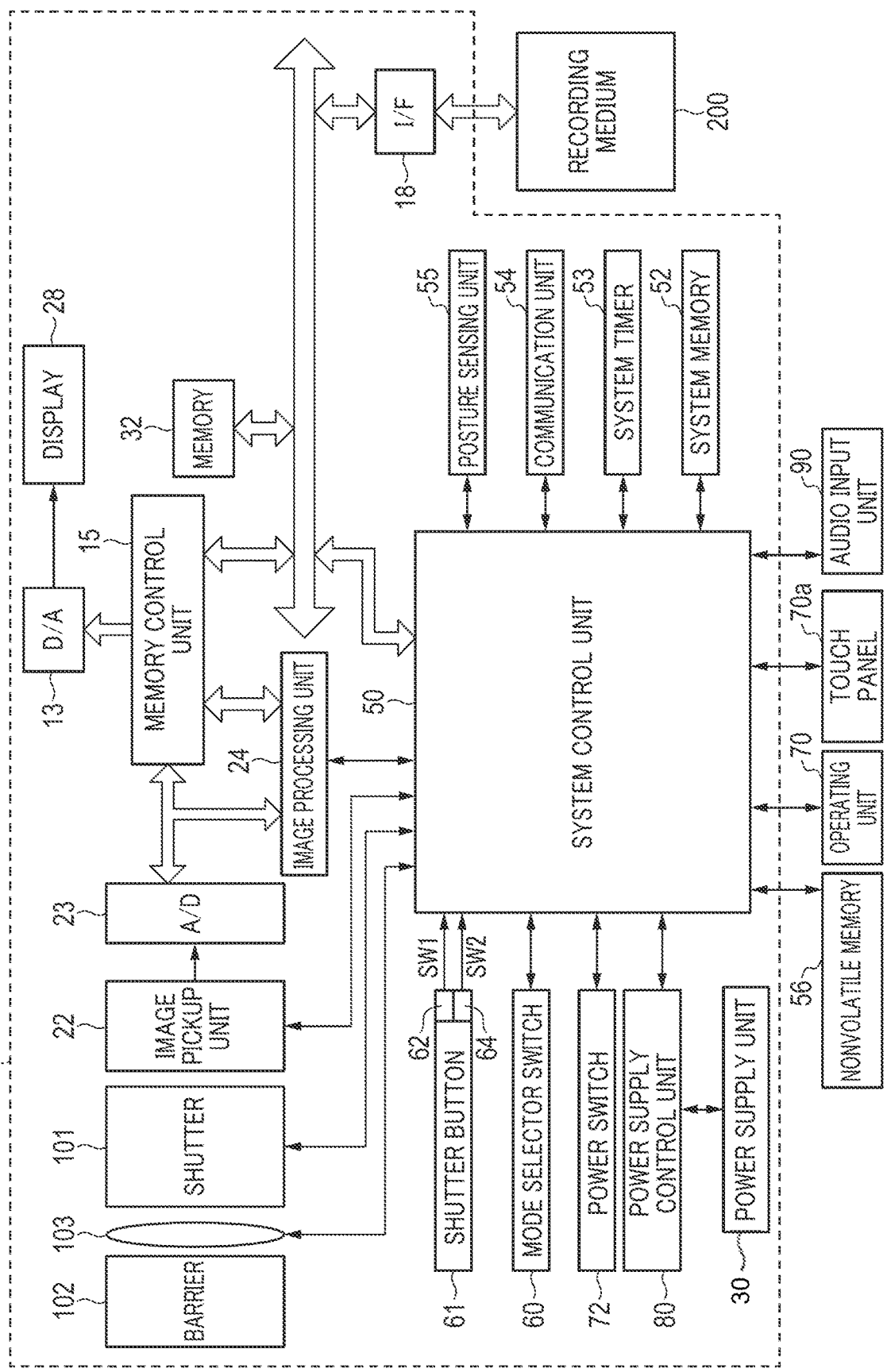
FIG. 2 is a block diagram showing a functional arrangement of the digital camera according to the embodiment of the present invention.

FIG. 2 is a block diagram showing an arrangement of the digital camera 100 according to the embodiment of the present invention. A description will now be given of elements provided in the digital camera 100.

A system control unit 50 is comprised of, for example, one or more processors such as a CPU (Central Processing Unit) and integratedly controls operation of the elements included in the digital camera 100.

A nonvolatile memory 56 is a storage medium which is nonvolatile and electrically erasable and programmable and comprised of, for example, an EEPROM (Electrically Erasable Programmable Read-Only Memory). The nonvolatile memory 56 stores values for operation (constants, variables, etc.) and programs for control.

A system memory 52 is a volatile storage medium and comprised of, for example, a RAM (Random Access Memory). The system memory 52 acts as a working memory on which values for operation (constants, variables, etc.) to be used by the system control unit 50 are stored and programs are expanded.

Description of various processes in the present embodiment which will be given later with reference to flowcharts and others are implemented by one or more processors, which the system control unit 50 has, expanding programs, which are stored in the nonvolatile memory 56, on the system memory 52 and executing them. It should be noted that at least a part of the various processes in the present embodiment may be implemented by an element other than the system control unit 50 under the control of the system control unit 50.

A taking lens 103 is a lens group including a zoom lens ad a focus lens. To simplify illustration, the taking lens 103 is schematically represented by one taking lens in FIG. 2, but the taking lens 103 may be comprised of a plurality of lenses. A shutter 101 is a focal-plane shutter that is controlled to open and close by the system control unit 50. An image pickup unit 22, which is an image pickup device comprised of a CCD or CMOS, converts an optical image of a subject formed on a light-incident surface into an electric signal and outputs the electric signal to an A/D converter 23. The A/D converter 23 converts the electric signal (analog signal) into a digital signal (image data) and outputs the digital signal to at least one of a memory control unit 15 and an image processing unit 24.

The image pickup unit 22 as well as the taking lens 103 and the shutter 101 constitutes an image pickup unit. A barrier 102 covers the image pickup unit to prevent stain and damage.

The image processing unit 24 is an integrated circuit that performs various types of image processing (image interpolation, resizing, color conversion, etc.) on a digital signal output from the A/D converter 23 or the memory control unit 15. The image processing unit 24 carries out various types of computation processes based on picked-up image data. The system control unit 50 is capable of carrying out an exposure control process and a metering control process based on results of the computation processes. These control processes implement an AF process, an AE process, an EF process (pre-flashing process) using the TTL (Through-The-Lens) method. The image processing unit 24 is also capable of carrying out an auto white balance (AWB) process using the TTL method.

A memory 32 is a storage medium that stores data such as image data obtained by the image pickup unit 22 and converted into a digital signal by the A/D converter 23 and image data that is to be displayed on the display 28. Image data output from the A/D converter 23 is subjected to processing by the image processing unit 24 and then written into the memory 32 via the memory control unit 15 or is directly written into the memory 32 via the memory control unit 15. The memory 32 has a capacity enough to store a predetermined number of still images or video and audio over a predetermined period of time. The memory 32 also acts as a video memory for image display.

A D/A converter 13 converts data for image display into an analog signal and supplies the analog signal to a display 28.

The display 28 has a display such as a liquid crystal display and displays image data for image display (analog signal), which was written into the memory 32 and supplied to the display 28 via the D/A converter 13, on the display. The display 28 acts as an electronic viewfinder that continuously displays through-the-lens images by displaying image data, which is successively supplied to the display 28 via the image pickup unit 22, A/D converter 23, the memory control unit 15, the memory 32 and the D/A converter 13, on the display 28. Namely, the digital camera 100 implements live view (LV) display by displaying picked-up images obtained by successive shooting using the image pickup unit on the display 28. Images displayed in live view may be referred to as "live view images".

The system control unit 50 controls display by controlling display-related elements such as the memory 32, D/A converter 13 and the display 28 described above.

A system timer 53 is a timing generating unit for use in various types of control and is also a time measurement unit that measures time in a built-in clock, not shown. The system control unit 50 controls operation of each component based on timing generated by the system timer 53.

As described earlier, the mode selector switch 60, the shutter button 61, the operating unit 70 (including a touch panel 70a which will be described later), and the controller wheel 73 constitute the operating unit according to the present embodiment. The operating unit inputs various operating instructions to the system control unit 50.

The mode selector switch 60 is used to switch among various types of operating modes. The operating modes include a still image mode in which still images are obtained, a video mode in which video is obtained, and a reproducing mode in which still images and video are reproduced. The still image mode includes an auto shooting mode, an auto scene determination mode, a manual mode, an aperture priority mode (Av mode), a shutter speed priority mode (Tv mode), a various scene mode in which shooting settings vary with shooting scenes, a program AE mode, and a custom mode. Likewise, the video shooting mode includes the plurality of modes mentioned above. By operating the mode selector switch 60, the user directly selects one of those modes. A mode may be selected from a mode list screen, which is displayed by operating the mode selector switch 60, by means of another operating member such as the touch panel 70a which will be described later.

The shutter button 61 includes a first shutter switch 62 that is turned on while being pressed (that is, pressed halfway down) and a second shutter switch 64 that is turned on by pressing it all the way down. When the first shutter switch 62 is turned on, a first shutter switch signal SW1 is output, which instructs the system control unit 50 to start a shooting preparation such as an AF process, an AE process, an AWB process, and an EF process. On the other hand, when the second shutter switch 64 is turned on, a second shutter switch signal SW2 is output, which instructs the system control unit 50 to start a sequence of shooting operations such as a signal reading process, a development process, a compression/expansion process, and a data writing process.

The operating unit 70 has a plurality of operating members as described earlier. A plurality of functions varying with scenes can be assigned to the respective operating members. Namely, each of the operating members is able to act as a functional button which is depressed to trigger a function suitable for a scene. The functions are assigned by, for example, selecting various function icons displayed on a setting screen of the display 28. Examples of the function buttons include an end button, a back button, an image feed button, a jump button, a narrowing-down button, a property change button, and a video recording button, but they are not limitative. When a menu button is pushed, a menu screen to configure various settings is displayed on the display screen 28. The user can intuitively configure various settings by using the menu screen displayed on the display 28 and a cross key and a SET button.

The controller wheel 73 is an operating member that detects a rotating operation performed by the user, which corresponds to selection of an option, and is, for example, a dial member that outputs a pulse signal by rotating according to the amount of the rotating operation. The system control unit 50 controls the components of the digital camera 100 based on the angle of the rotating operation and the number of rotations identified by the pulse signal. It should be noted that the controller wheel 73 may be a touch wheel member that does not rotate by itself and has a touch sensor that detects a motion of user's fingers rotating the controller wheel 73 and then outputs a signal.

A power supply unit 30 is an element that supplies power to the digital camera 100 and comprised of at least one of the following: a primary battery (an alkali battery, a lithium battery, etc.), a secondary battery (an NiCd battery, an NiMH battery, an Li battery, etc.), and an AC adapter. A power supply control unit 80 is comprised of a battery detecting circuit, a DC-DC converter, a switch circuit that switches blocks to be energized, and so forth. The power supply control unit 80 is capable of detecting whether a battery is installed, a type of the installed battery, and a remaining capacity of the battery. The power supply control unit 80 controls the DC-DC converter based on instructions from the system control unit 50 and supplies required voltages to the components (including the recording medium 200) of the digital camera 100 for a required period of time.

A recording medium I/F 18 is an interface for connecting to the recording medium 200 that is connectable to the digital camera 100. The recording medium 200 is an external recording medium such as a memory card which records images and video obtained by the digital camera 100 and is comprised of a storage device such as a semiconductor memory and a magnetic disk. The system control unit 50 is capable of recording videos, which are obtained through a process according to the present embodiment, in the recording medium 200 via the recording medium I/F 18.

A communication unit 54 is a communication interface that connects the digital camera 100 to other devices through wired or wireless communications and sends and receives video signals and audio signals and is connectable to networks such as a wireless LAN and the Internet. The communication unit 54 is capable of sending still images and videos (including LV images) obtained by the digital camera 100 and still images and videos recorded in the recording medium 200 to external devices and receiving images and various types of information from the external devices.

A posture sensing unit 55 senses a posture of the digital camera 100 in the direction of gravity and outputs posture information to the system control unit 50. The posture sensing unit 55 is comprised of, for example, an acceleration sensor and a gyro sensor. The system control unit 50 is capable of attaching orientation information corresponding to posture information from the posture sensing unit 55 to an image and converting an orientation of an image based on posture information and recording it. Orientation information attached to an image is information indicating an orientation (portrait or landscape) of the digital camera 100 at a point in time when the image was shot.

The operating unit 70 has the touch panel 70a which senses a user's touching operation on the display 28. The touch panel 70a is attached to a display surface of the display 28 in a manner being integral with the display surface. The light transmittance of the touch panel 70a is preferably set to a value that does not interfere with display on the display 28. A GUI (Graphical User Interface) enabling the user to intuitively operate a display screen displayed by the display 28 is provided by associating input coordinates of the touch panel 70a and display coordinates of the display 28 with each other. The system control unit 50 is capable of detecting touching operations, which will be described below, on the touch panel 70a based on input coordinates input from the touch panel 70a.

Touch-down: a contact body such as a finger and a pen has started touching the touch panel 70a Touch-on: the contact body is touching the touch panel 70a without moving Touch-move: the contact body is moving while being in contact with the touch panel 70a Touch-up: the contact body that had been in contact with the touch panel 70a has left the touch panel 70a Touch-off: the contact body is not in contact with the touch panel 70a When the touch-down is detected, the touch-on is also detected at the same time. After the touch-down, the touch-on usually continues to be detected unless the touch-up is detected. The touch-move is detected in a state in which the touch-on is being detected. Even when the touch-on is detected, the touch-move is not detected unless a touch position has shifted. After the touch-up of all contact bodies that have touched the touch panel 70a is detected, the touch-off is detected.

An audio input unit 90 converts sound collected by a microphone into an electric signal (an audio signal) and outputs it to the system control unit 50. The system control unit 50 is capable of recording the input audio signal as audio data as well as video and also using the input audio signal for voice input (an operating instruction using voice). An audio input process will be described below.

The system control unit 50 uses an arbitrary suitable voice recognition algorithm to remove sound other than user's voice from the input audio signal, extract phonemes, which are minimum units of a spoken language, and recognize characters based on the extracted phonemes. It should be noted that the system control unit 50 may also recognize a word based on a plurality of recognized characters. The system control unit 50 determines whether a combination of a plurality of characters, a word, or a combination of words obtained by the voice recognition corresponds to a wake word or a control word.

Upon determining that it corresponds to a wake word, the system control unit 50 shifts to a state where it is ready to receive a control word ("control voice input enabled state"). When a control word is input to the audio input unit 90 in this state, the system control unit 50 performs a control operation for the input control word. For example, the system control unit 50 is able to start or stop video recording according to the control word. It should be noted that a wake word and a control word may be referred to collectively as "control-related words".

It should be noted that voice recognition (phoneme analysis and word analysis) described above may be performed by an apparatus other than the digital camera 100. For example, the system control unit 50 may supply an audio signal input via the audio input unit 90 to an external apparatus, and the external apparatus performs voice recognition and sends a recognition result back to the digital camera 100.

Figure 3:
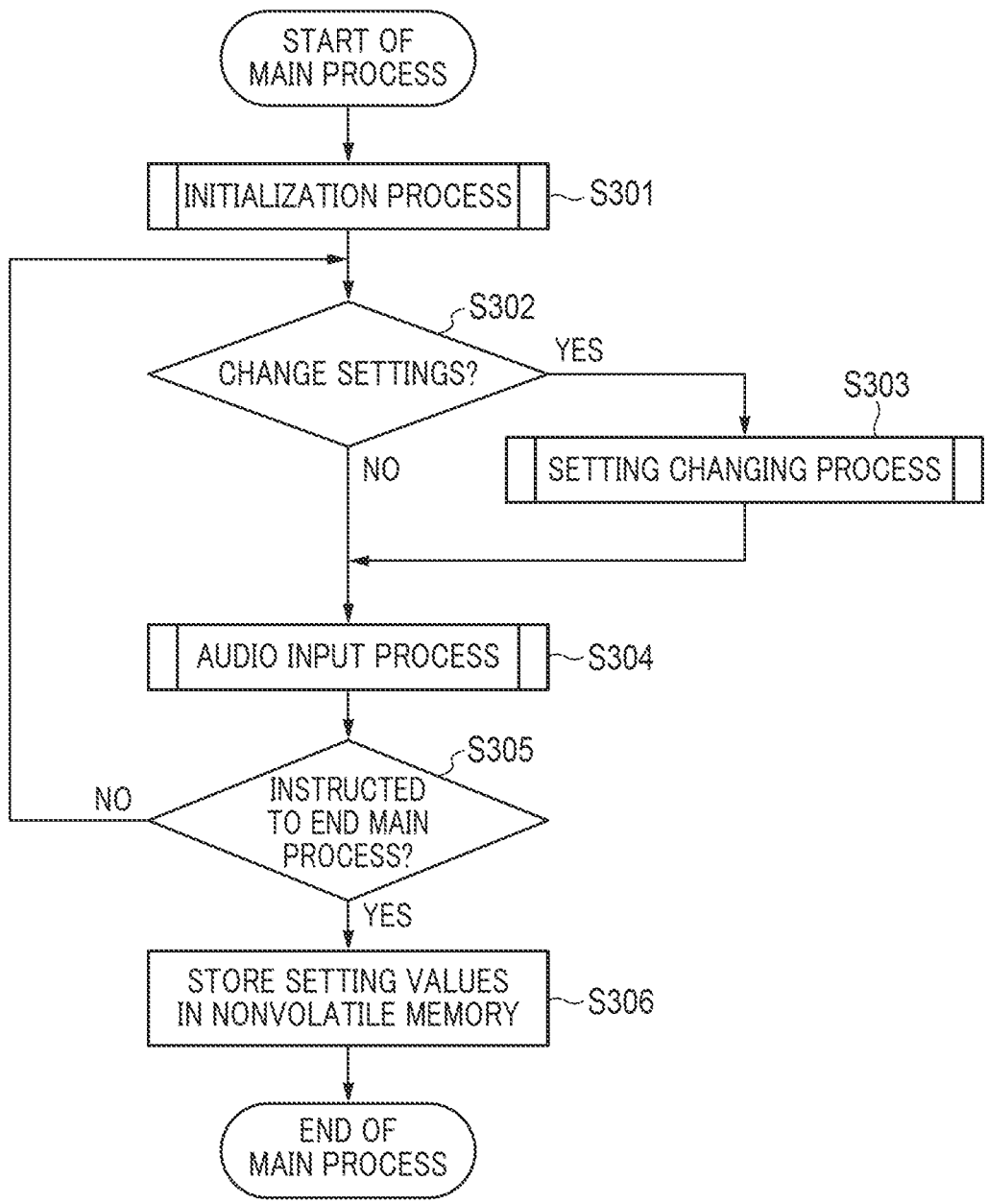
FIG. 3 is a flowchart showing a main process in the embodiment of the present invention.

FIG. 3 is a flowchart showing a main process in the embodiment of the present invention. The main process, which is performed after power of the digital camera 100 is turned ON, in the present embodiment is a sequential process including recognition of user's voice, starting and stopping of video recording by voice operation, and edition of video data. As described earlier, the main process in this flowchart is implemented by one or more processors, which the system control unit 50 has, expanding a program stored in the nonvolatile memory 56 on the system memory 52 and executing the same.

In step S301, the system control unit 50 carries out an initialization process. The initialization process in this step will be described in detail later with reference to FIG. 4.

Figure 5A:
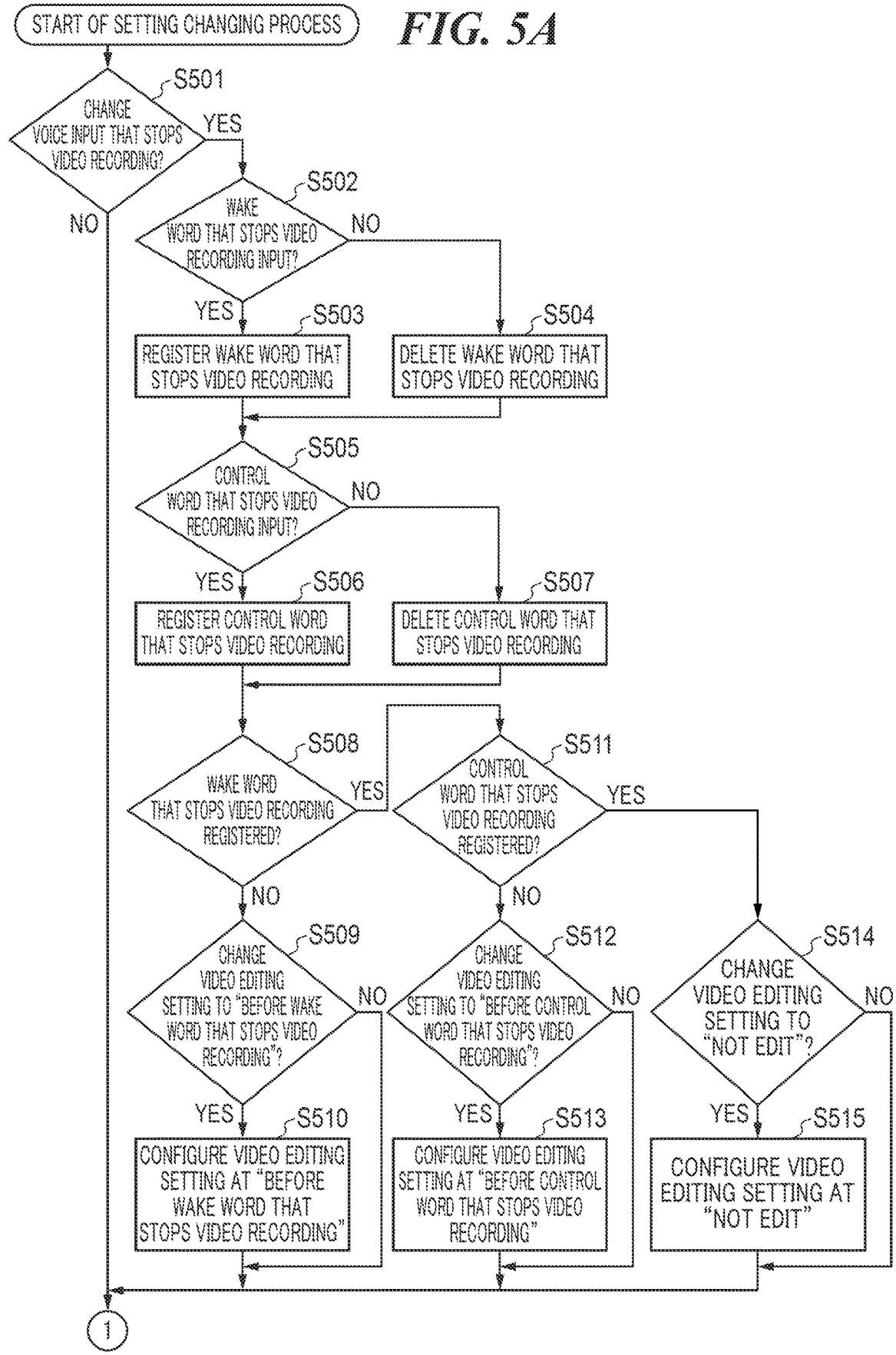
FIGS. 5A and 5B are flowcharts showing a setting changing process in the embodiment of the present invention.
Figure 5B:
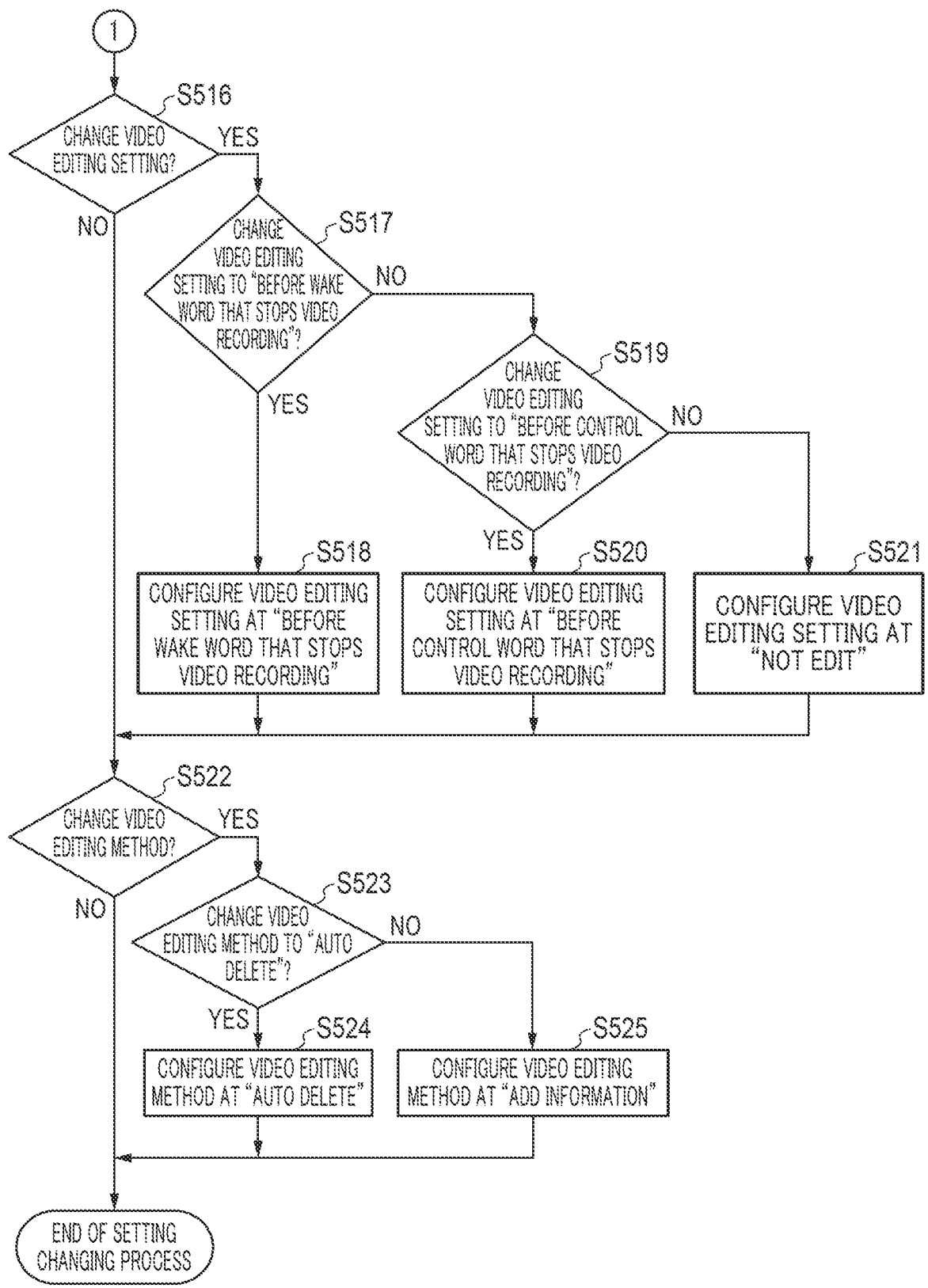
Figure 7A:
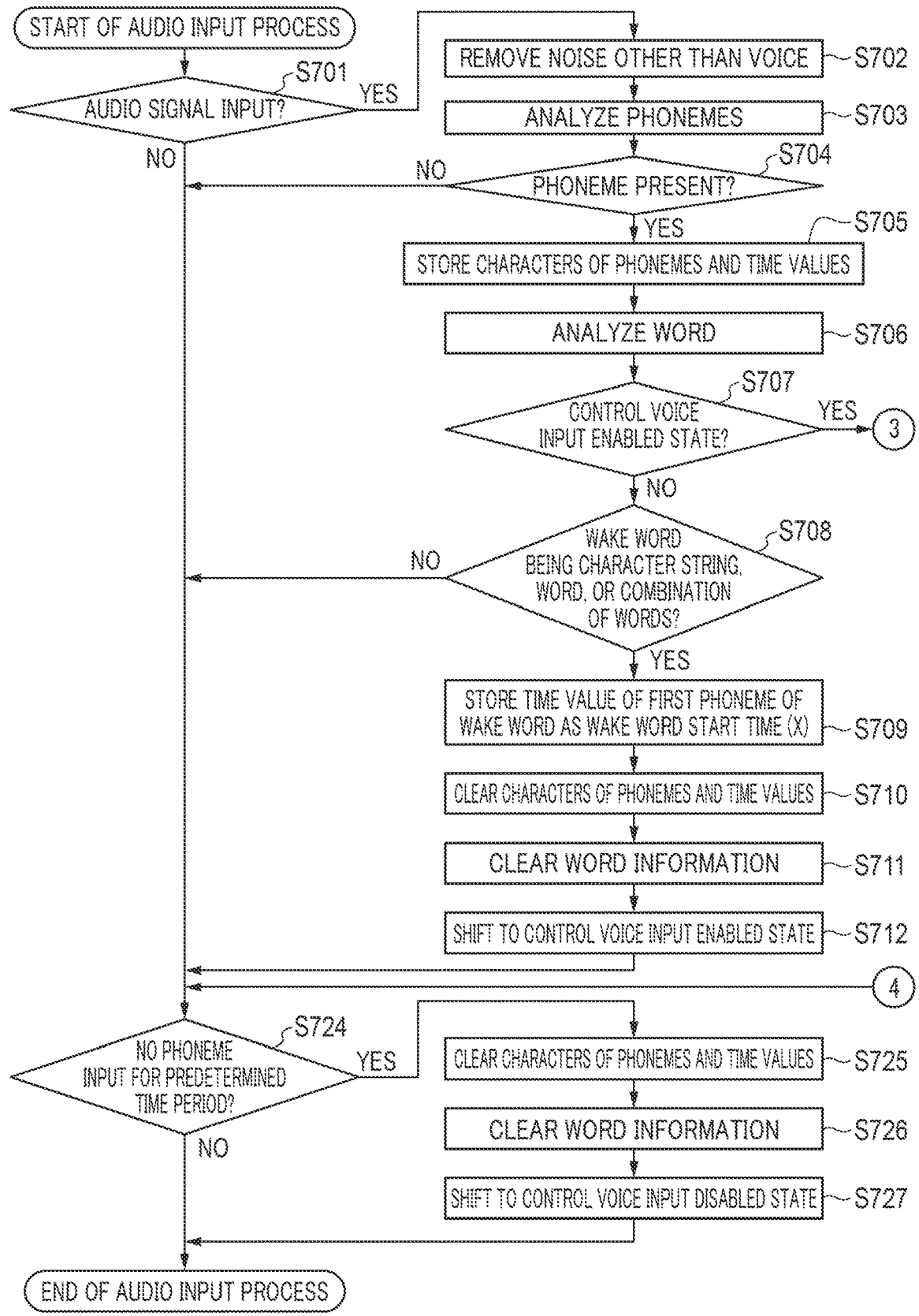
FIGS. 7A and 7B are flowcharts showing a voice input process in the embodiment of the present invention.
Figure 7B:
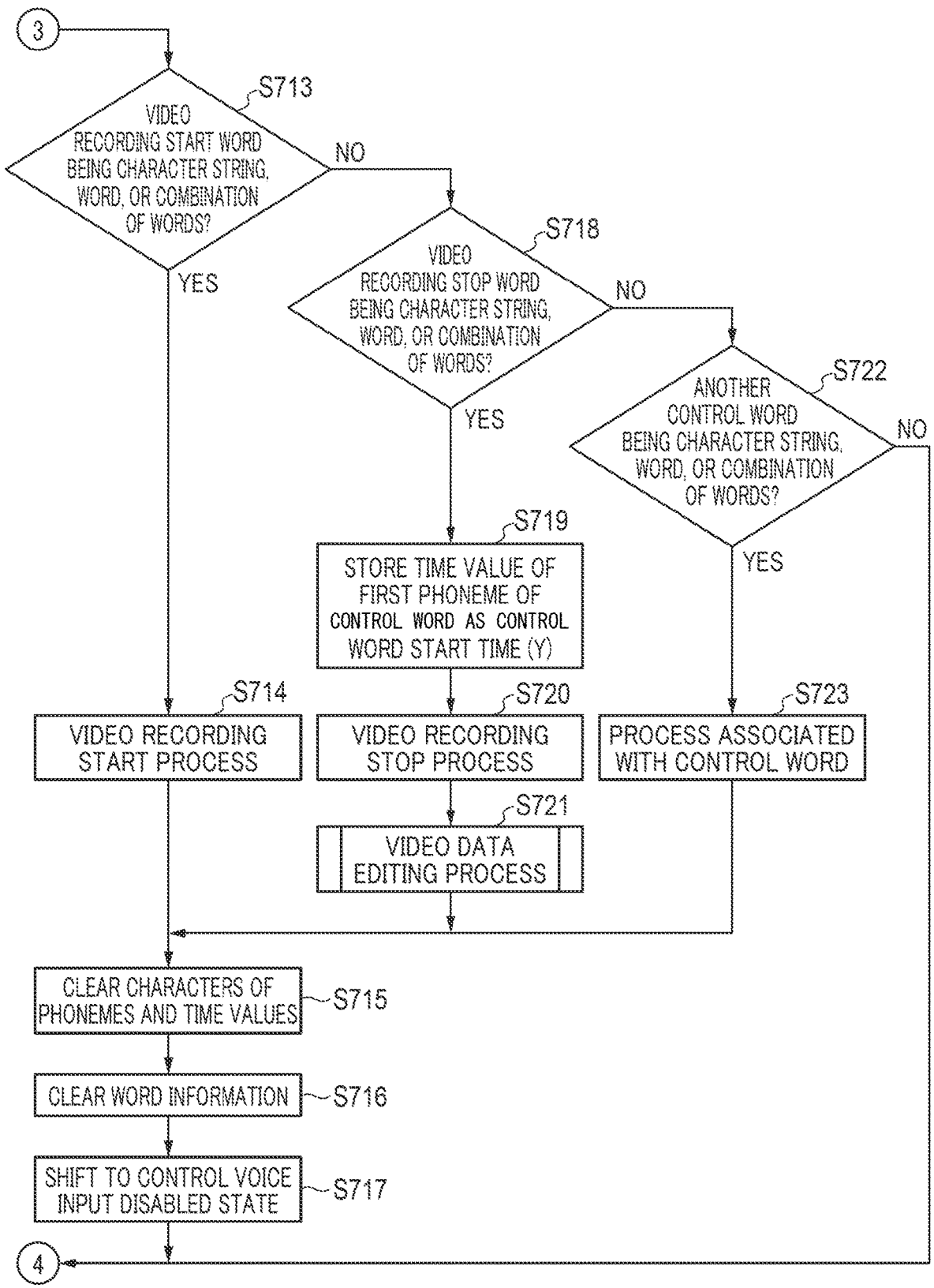

In step S302, the system control unit 50 determines whether an instruction to change settings has been issued by a user operation on the operating unit. To change settings is a concept including registration or deletion of a "wake word that stops video recording", registration or deletion of a "control word that stops video recording", changing of "video editing setting", and changing of a "video editing method". When the system control unit 50 determines that the instruction to change settings has been issued (S302: YES), the process proceeds to a setting changing process in step S303 (FIGS. 5A and 5B). On the other hand, when the system control unit 50 determines that the instruction to change settings has not been issued (S302: NO), the process proceeds to an audio input process in step S304 (FIGS. 7A and 7B).

In the step S303, the system control unit 50 carries out the setting changing process. The setting changing process in this step will be described in detail later with reference to FIGS. 5A and 5B and FIGS. 6A to 6D.

In the step S304, the system control unit 50 carries out the audio input process. The audio input process in this step will be described in detail later with reference to FIGS. 7A and 7B.

In step S305, the system control unit 50 determines whether an instruction to end the main process has been issued by an operation such as depression of the power switch 72. When the system control unit 50 determines in the step S305 that the instruction to end the main process has been issued (S305: YES), the process proceeds to step S306. On the other hand, when the system control unit 50 determines that the instruction to end the main process has not been issued (S305: NO), the process returns to the step S302.

In the step S306, the system control unit 50 ends the main process by storing setting values in the nonvolatile memory 56. The setting values are values that represent the "wake word that stops video recording", the "control word that stops video recording", the "video editing setting", and the "video editing method".

Figure 4:
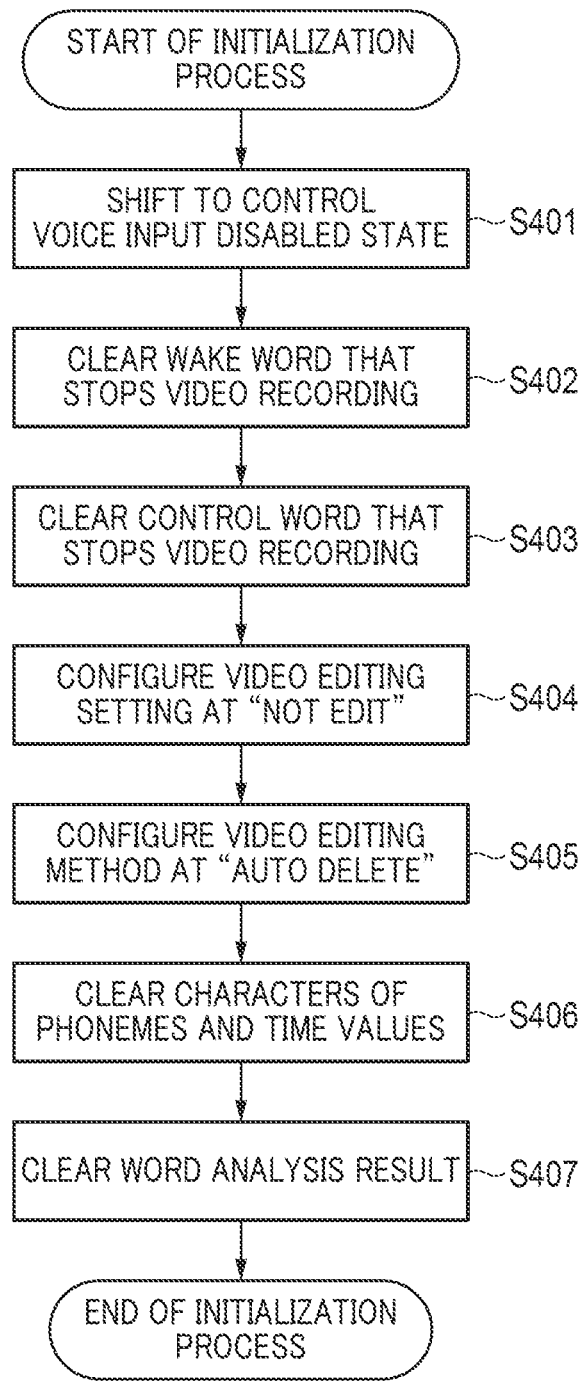
FIG. 4 is a flowchart showing an initialization process in the embodiment of the present invention.

FIG. 4 is a flowchart showing in detail the initialization process in the step S301 in FIG. 3. In general, initialization relating to setting values for voice input and video editing (initialization of the system memory 52) is performed in this initialization process.

In step S401, the system control unit 50 sets a "control voice input disabled state" at a location (area) indicating a "voice input receiving state" in the system memory 52.

Here, in a case where a setting value is stored in a location indicating the "voice input receiving state" in the nonvolatile memory 56, the system control unit 50 sets this setting value at the location indicating the "voice input receiving state" in the system memory 52.

In step S402, the system control unit 50 clears the location indicating the "wake word that stops video recording". In a case where a setting value is stored at a location indicating the "wake word that stops video recording" in the nonvolatile memory 56, the system control unit 50 sets this setting value at the location indicating the "wake word that stops video recording" in the system memory 52.

In step S403, the system control unit 50 clears the location indicating the "control word that stops video recording" in the system memory 52. In a case where a setting value is stored at a location indicating the "control word that stops video recording" in the nonvolatile memory 56, the system control unit 50 sets this setting value at the location indicating the "control word that stops video recording" in the system memory 52.

In step S404, the system control unit 50 sets "not edit" at a location indicating the "video editing setting" in the system memory 52. Here, in a case where a setting value is stored at a location indicating the "video editing setting" in the nonvolatile memory 56, the system control unit 50 sets this setting value at the location indicating the "video editing setting" in the system memory 52.

In step S405, the system control unit 50 sets "auto delete" at a location indicating the "video editing method" in the system memory 52. Here, in a case where a setting value is stored at a location indicating the "video editing method" in the nonvolatile memory 56, the system control unit 50 sets this setting value in the place indicating the "video editing method" in the system memory 52.

In step S406, the system control unit 50 clears a location indicating "characters of phonemes and time values" in the system memory 52.

In step S407, the system control unit 50 clears a location indicating "word analysis results" in the system memory 52.

FIGS. 5A and 5B are flowcharts showing the setting changing process in the step S303 in FIG. 3. FIGS. 6A to 6D are views useful in explaining examples of setting changing screens. In the setting changing process, in accordance with instructions input from the user, settings as to audio input and video editing are changed. In general, the wake word and the control word which are audio input settings as to video recording are changed in accordance with instructions input from the user.

As shown in FIG. 5A, in step S501, the system control unit 50 determines whether an operation on the operating unit by the user is an instruction to change settings as to "voice input that stops video recording". When the result of the determination is positive (YES), the process proceeds to step S502, and the setting changing screen in FIG. 6A is displayed on the display 28. The setting changing screen in FIG. 6A includes a text box 601 in which the "wake word that stops video recording" can be entered, a text box 602 in which the "control word that stops video recording" can be entered, and an OK button 603. On the other hand, when the result of the determination is negative (NO), the process proceeds to step S516.

In the step S502, the system control unit 50 determines whether the user has input the "wake word that stops video recording". More specifically, when the OK button 603 is touched in a state where a character string representing the wake word has been entered in the text box 601, the system control unit 50 determines that the user has input the "wake word that stops video recording" (S502: YES). On the other hand, when the OK button 603 is touched in a state where the text box 601 is blank, the system control unit 50 determines that the user has not input the "wake word that stops video recording" (S502: NO). When the result of the determination in the step S502 is positive (YES), the process proceeds to step S503, and when the result of the determination in the step S502 is negative (NO), the process proceeds to step S504.

In the step S503, the system control unit 50 stores (that is, registers) the "wake word that stops video recording", which has been entered by the user, at a location indicating the "wake word that stops video recording" in the system memory 52. The system control unit 50 may store the "wake word that stops video recording" as a character string or as a word. In the case where the "wake word that stops video recording" is stored as a word, the system control unit 50 may perform a word analysis for the input character string or may identify where one word starts and another word starts when the user inputs a word.

In the step S504, the system control unit 50 clears a location indicating the "wake word that stops video recording" in the system memory 52.

In step S505, the system control unit 50 determines whether the user has input the "control word that stops video recording". More specifically, when the OK button 603 is touched in a state where a character string representing the control word has been entered in the text box 601, the system control unit 50 determines that the user has input the "control word that stops video recording" (S505: YES). On the other hand, when the OK button 603 is touched in a state where the text box 601 is blank, the system control unit 50 determines that the user has not input the "control word that stops video recording" (S505: NO). When the result of the determination in the step S505 is positive (YES), the process proceeds to step S506, and when the result of the determination in the step S505 is negative (NO), the process proceeds to step S507.

In the step S506, the system control unit 50 stores (that is, registers) the "control word that stops video recording", which has been entered by the user, at a location indicating the "control word that stops video recording" in the system memory 52. The system control unit 50 may store the "control word that stops video recording" as a character string or as a word. In the case where the "control word that stops video recording" is stored as a word, the same analysis is performed as in the step S503.

In the step S507, the system control unit 50 clears a location indicating the "control word that stops video recording" in the system memory 52.

In step S508, the system control unit 50 determines whether the "wake word that stops video recording" is recorded in the system memory 52. When the result of the determination in the step S508 is positive (YES), the process proceeds to step S511, and when the result of the determination in the step S508 is negative (NO), the process proceeds to step S509.

In the step S509, the system control unit 50 causes the display 28 to display the setting changing screen in FIG. 6B and determines whether an instruction to change the "video editing setting" to "before the wake word that stops video recording" has been issued. More specifically, when a YES button 605 is touched in a state where a check box 604 indicating "before the wake word" on the setting changing screen in FIG. 6B is checked, the result of the determination by the system control unit 50 in the step S509 is positive (YES). On the other hand, when a NO button 606 is touched in a state where the check box 604 indicating "before the wake word" on the setting changing screen in FIG. 6B is checked, the result of the determination by the system control unit 50 in the step S509 is negative (NO). When the result of the determination in the step S509 is positive (YES), the process proceeds to step S510, and when the result of the determination in the step S509 is negative (NO), the process proceeds to the step S516. It should be noted that in the step S509, the check box 604 indicating "before the wake word" is preferably displayed such that it cannot be changed in a checked state.

In the step S510, the system control unit 50 sets "before the wake word that stops video recording" at a location indicating the "video editing setting" in the system memory 52, and the process then proceeds to the step S516.

In the step S511, the system control unit 50 determines whether the "control word that stops video recording" is recorded in the system memory 52. When the result of the determination in the step S511 is positive (YES), the process proceeds to step S514, and when the result of the determination in the step S511 is negative (NO), the process proceeds to step S512.

In the step S512, the system control unit 50 determines whether an instruction to change the "video editing setting" to "before the control word that stops video recording" has been issued. When the result of the determination in the step S512 is positive (YES), the process proceeds to step S513, and when the result of the determination in the step S512 is negative (NO), the process proceeds to the step S516.

In the step S513, the system control unit 50 sets "before the control word that stops video recording" at a location indicating the "video editing setting" in the system memory 52, and the process then proceeds to the step S516.

In the step S514, the system control unit 50 determines whether an instruction to change the "video editing setting" to "not edit" has been issued. When the result of the determination in the step S514 is positive (YES), the process proceeds to step S515, and when the result of the determination in the step S514 is negative (NO), the process proceeds to the step S516.

In the step S515, the system control unit 50 sets "not edit" at a location indicating the "video editing setting" in the system memory 52, and the process then proceeds to the step S516.

In the step S516, the system control unit 50 determines whether an operation on the operating unit by the user is an instruction to change the "video editing setting". When the result of the determination in the step S516 is positive (YES), the process proceeds to step S517, and the setting changing screen in FIG. 6C is displayed on the display 28. The setting changing screen in FIG. 6C includes elements such as a check box 607 indicating "before the wake word" and an OK button 608. On the other hand, when the result of the determination in the step S516 is negative (NO), the process proceeds to step S522.

In the step S517, the system control unit 50 determines whether an instruction to change the "video editing setting" to "before the wake word that stops video recording" has been issued. More specifically, when the OK button 608 is touched in a state where the check box 607 is checked, the system control unit 50 determines that the instruction to change the "video editing setting" to "before the wake word that stops video recording" has been issued (S517: YES). When the result of the determination in the step S517 is positive (YES), the process proceeds to step S518, and when the result of the determination in the step S517 is negative (NO), the process proceeds to step S519. It should be noted that on the setting changing screen shown in FIG. 6C, only a checkbox which was checked last among a plurality of checkboxes is preferably checked.

In the step S518, the system control unit 50 sets "before the wake word that stops video recording" at a location indicating the "video editing setting" in the system memory 52, and the process then proceeds to the step S522.

In the step S519, the system control unit 50 determines whether an instruction to change the "video editing setting" to "before the control word that stops video recording" has been issued. More specifically, when the OK button 608 is touched in a state where a checkbox indicating "before the control word that stops video recording" is checked, the system control unit 50 determines that the instruction to change the "video editing setting" to "before the control word that stops video recording" has been issued (S519: YES). When the result of the determination in the step S519 is positive (YES), the process proceeds to step S520, and when the result of the determination in the step S519 is negative (NO), the process proceeds to step S521.

In the step S520, the system control unit 50 sets "before the control word that stops video recording" at a location indicating the "video editing setting" in the system memory 52, and the process then proceeds to the step S522.

In the step S521, the system control unit 50 sets "not edit" at a location indicating the "video editing setting" in the system memory 52, and the process then proceeds to the step S522.

In the step S522, the system control unit 50 determines whether an operation on the operating unit by the user is an instruction to change the "video editing method". When the result of the determination in the step S522 is positive (YES), the process proceeds to step S523, and the setting changing screen in FIG. 6D is displayed on the display 28. The setting changing screen in FIG. 6D includes elements such as a checkbox 609 indicating "auto delete" and an OK button 610. On the other hand, when the result of the determination in the step S522 is negative (NO), the system control unit 50 ends the flow of the setting changing process.

In the step S523, the system control unit 50 determines whether an instruction to change the "video editing method" to "auto delete" has been issued. More specifically, when the OK button 810 is touched in a state where the checkbox 609 is checked, the system control unit 50 determines that the instruction to change the "video editing method" to "auto delete" has been issued (S523: YES). When the result of the determination in the step S523 is positive (YES), the process proceeds to step S524, and when the result of the determination in the step S523 is negative (NO), the process proceeds to step S525. It should be noted that on the setting changing screen shown in FIG. 6D, only a checkbox which was checked last among a plurality of checkboxes is preferably checked.

In the step S524, the system control unit 50 sets "auto delete" at a location indicating the "video editing method" in the system memory 52, and the system control unit 50 ends the flow of the setting changing process.

In the step S525, the system control unit 50 sets "add information" at a location indicating the "video editing method" in the system memory 52, and the system control unit 50 ends the flow of the setting changing process.

FIGS. 7A and 7B are flowcharts showing the audio input process in the step S304 in FIG. 3. In general, in the audio input process, an input audio signal is analyzed, and based on the result of the analysis, starting and stopping of video recording is controlled. As is clear from the flowchart of FIG. 3, the audio input process shown in FIGS. 7A and 7B is repeatedly carried out while the main process is being carried out. It should be noted that in each of steps included in the audio input process, an arbitrary suitable voice recognition algorithm can be used.

In step S701, the system control unit 50 determines whether an audio signal has been input through the microphone and the audio input unit 90. When the result of the determination in the step S701 is positive (YES), the process proceeds to step S702, and when the result of the determination in the step S701 is negative (NO), the process proceeds to step S724.

In the step S702, the system control unit 50 removes sound (noise) other than user's voice from the input audio signal.

In the step S703, for the audio signal from which the noise was removed in the step S702, the system control unit 50 performs a phoneme analysis to extract phonemes which are minimum unit waveforms of voice corresponding to characters.

In the step S704, based on the result of the phoneme analysis in the step S703, the system control unit 50 determines whether there is a phoneme (a sound that can be converted into a character) in the input audio signal. When the result of the determination in the step S704 is positive (YES), the process proceeds to step S705, and when the result of the determination in the step S704 is negative (NO), the process proceeds to step S724.

In the step S705, based on the result of the phoneme analysis in the step S703, the system control unit 50 stores a value of time at which a waveform starts and a corresponding character relating to each one of the obtained plurality of phonemes in the form of a table in the system memory 52.

In step S706, the system control unit 50 performs a word analysis for the characters corresponding to the audio signal stored in the system memory 52 in the step S705. The result of this word analysis can be stored in the system memory 52.

In the step S707, the system control unit 50 determines whether a location indicating the "audio input receiving state" in the system memory 52 indicates the "audio input enabled state". When the result of the determination in the step S707 is positive (YES), the process proceeds to step S713 in FIG. 7B, and when the result of the determination in the step S707 is negative (NO), the process proceeds to step S708.

In the step S708, the system control unit 50 determines whether a combination of a plurality of characters, a word, or a combination of words obtained by voice recognition corresponds to the wake word. When the result of the determination in the step S708 is positive (YES), the process proceeds to step S709, and when the result of the determination in the step S708 is negative (NO), the process proceeds to the step S724.

Here, in the step S708, the system control unit 50 may make the determination based on a character string obtained by combining the characters obtained in the step S705 or based on a word (or a combination of words) obtained as a result of the word analysis in the step S706. It should be noted that in a case where the "wake word that stops video recording" is stored in the system memory 52, and video recording is underway, the system control unit 50 can also use the "wake word that stops video recording" as the wake word in the determination in the step S708 as well.

In the step S709, the system control unit 50 stores a value of time at which the first phoneme included in the audio signal corresponding to the characters or word (wake word) relating to the determination in step S708 is started as a wake word start time X in the system memory 52. The system control unit 50 is capable of reading information required for this step from the table showing the phonemes and the time values stored in the step S705.

In step S710, the system control unit 50 clears data on the phonemes and the time values related to the present process, which has been stored in the system memory 52.

In step S711, the system control unit 50 clears the word information related to the present process, which has been stored in the system memory 52.

In step S712, the system control unit 50 causes the system memory 52 to shift from the "audio input receiving state" to the "control voice input enabled state", and the process then proceeds to the step S724.

A description will now be given of the steps S713 to S723 in FIG. 7B. In the step S713, the system control unit 50 determines whether a combination of a multiple characters, a word, or a combination of words obtained by voice recognition corresponds to a control word indicating the start of video recording. When the result of the determination in the step S713 is positive (YES), the process proceeds to the step S714, and when the result of the determination in the step S713 is negative (NO), the process proceeds to the step S718.

Here, in the step S713, the system control unit 50 may make the determination based on a character string obtained by combining the characters obtained in the step S705 or based on a word (or a combination of words) obtained as a result of the word analysis in the step S706.

In the step S714, the system control unit 50 carries out a process in which it starts video recording, and the process then proceeds to the step S715.

In the step S715, the system control unit 50 clears data on the characters of the phonemes and the time values related to the present process, which has been stored in the system memory 52.

In the step S716, the system control unit 50 clears the word information related to the present process, which has been stored in the system memory 52.

In the step S717, the system control unit 50 causes the system memory 52 to shift from the "audio input receiving state" to the "control voice input disabled state". After the step S717 is completed, the process then proceeds to the step S724.

In the step S718, the system control unit 50 determines whether a combination of a plurality of characters, a word, or a combination of words obtained by voice recognition corresponds to a control word indicating the stop of video recording. When the result of the determination in the step S718 is positive (YES), the process proceeds to the step S719, and when the result of the determination in the step S718 is negative (NO), the process proceeds to the step S722.

Here, in the step S718, the system control unit 50 may make the determination based on a character string obtained by combining the characters obtained in the step S705 or based on a word (or a combination of words) obtained as a result of the word analysis in the step S706. It should be noted that when the "control word that stops video recording" is stored in the system memory 52, and video recording is underway, the system control unit 50 can also use the "control word that stops video recording" as the control word in the determination in the step S718 as well.

In the step S719, the system control unit 50 stores a value of time at which the first phoneme included in an audio signal corresponding to characters or word (the control word that stops video recording) relating to the determination in the step S718 is started, as a control word start time Y in the system memory 52. The system control unit 50 reads information required for this step from the table, stored in the step S705, indicating the phonemes and the time values.

In the step S720, the system control unit 50 carries out a process in which it stops video recording.

In the step S721, the system control unit 50 carries out a process in which it edits video data, and the process then proceeds to the step S715. The video editing process in the step S721 will be described in detail later with reference to FIG. 8.

In the step S722, the system control unit 50 determines whether a combination of a plurality of characters, a word, or a combination of words obtained by voice recognition corresponds to another control word. When the result of the determination in the step S722 is positive (YES), the process proceeds to the step S723, and when the result of the determination in the step S722 is negative (NO), the process proceeds to the step S724.

Here, in the step S722, the system control unit 50 may make the determination based on a character string obtained by combining the characters obtained in the step S705 or based on a word (or a combination of words) obtained as a result of the word analysis in the step S706.

In the step S723, the system control unit 50 carries out a process based on the other control word relating to the determination in the step S722, and the process then proceeds to the step S715.

In the step S724 in FIG. 7A, the system control unit 50 determines whether the determination in the step S704 as to the presence of a phoneme has continuously been negative (NO) for a predetermined period of time or longer. When the system control unit 50 determines that no phoneme has continuously been present for the predetermined period of time or longer, the process proceeds to the step S725, and when a phoneme has been present within a period of time shorter than the predetermined period of time, the system control unit 50 ends the flow of the audio input process.

In the step S725, the system control unit 50 clears data on the characters of the phonemes and the time value related to the present process, which has been stored in the system memory 52.

In the step S726, the system control unit 50 clears the word information related to the present process, which has been stored in the system memory 52.

In the step S727, the system control unit 50 causes the system memory 52 to shift from the "audio input receiving state" to the "control voice input disabled state". After completing the step S727, the system control unit 50 ends the flow of the audio input process.

FIG. 8 is a flowchart showing the video editing process in the step S721 in FIG. 7A. Generally, in this process, video data before the time at which the control-related word starts is cut out as a video file, or reference information indicating the time at which the control-related word starts is added to video data.

In step S801, the system control unit 50 determines whether a location indicating the "video editing method" in the system memory 52 indicates "auto delete". When the result of the determination in the step S801 is positive (YES), the process proceeds to step S802, and when the result of the determination in the step S801 is negative (NO), the process proceeds to step S806.

In the step S802, the system control unit 50 determines whether a location indicating the "video editing setting" in the system memory 52 indicates "before the wake word that stops video recording". When the result of the determination in the step S802 is positive (YES), the process proceeds to step S803, and when the result of the determination in the step S802 is negative (NO), the process proceeds to step S804.

In the step S803, the system control unit 50 cuts out data before the wake word starting time X in the system memory 52 from video data relating to the video recording process stopped in the step S720 as a video file and records it in the recording medium 200.

In the step S804, the system control unit 50 determines whether a location indicating the "video editing setting" in the system memory 52 indicates "before the control word that stops video recording". When the result of the determination in the step S804 is positive (YES), the process proceeds to step S805, and when the result of the determination in the step S804 is negative (NO), the system control unit 50 ends the flow of the video editing process.

In the step S805, the system control unit 50 cuts out data before the control word start time Y in the system memory 52 from video data relating to the video recording process stopped in the step S720 as a video file and records it in the recording medium 200.

In the step S806, the system control unit 50 determines whether a location indicating the "video editing setting" in the system memory 52 indicates "before the wake word that stops video recording". When the result of the determination in the step S806 is positive (YES), the process proceeds to step S807, and when the result of the determination in the step S806 is negative (NO), the process proceeds to step S808.

In the step S807, the system control unit 50 adds reference information indicating the wake word start time X to a frame corresponding to the wake word start time X in the video data related to the video recording process stopped in the step S720 and records it in the recording medium 200. The user can delete video data in the frame, to which reference information indicating the wake word start time X was added, and the subsequent frames from the video file later based on the reference information.

In the step S808, the system control unit 50 determines whether a location indicating the "video editing setting" in the system memory 52 indicates "before the control word that stops video recording". When the result of the determination in the step S808 is positive (YES), the process proceeds to step S809, and when the result of the determination in the step S808 is negative (NO), the system control unit 50 ends the flow of the video editing process.

In the step S809, the system control unit 50 adds reference information indicating the control word start time Y to a frame corresponding to the control word start time Y in the video data related to the video recording process stopped in the step S720 and records it in the recording medium 200. The user can delete video data in the frame, to which reference information indicating the control word start time Y was added, and the subsequent frames from the video file later based on the reference information.

According to the arrangement of the embodiment described above, an unnecessary control voice can be properly deleted from video. According to the arrangement in which video data before the time at which a control-related word (a wake word or a control ward) starts is recorded as a video file, a voice related to the control-related word can be properly removed from the video file. Moreover, according to the arrangement in which reference information is added to a frame in video data corresponding to the time at which the control-related word starts, and the video data is recorded as a video file, a part including a voice related to the control-related word included in the frame or any of the subsequent frames can be easily removed from the video file. In addition, according to the arrangement in which the user is able to switch ranges over which video data is recorded and locations to which reference information is added, the user can easily leave a desired part in a video file.

Other Embodiment

The embodiment described above are modified in various ways. Concrete examples of the modifications will be given below. Two or more forms arbitrarily selected from the embodiment described above and the modifications described below can be combined as appropriate insofar as they are not mutually contradictory.

In the audio-related processes in FIGS. 7A, 7B, and 8, the system control unit 50 may carry out a voice recognition process using a neural network. In this case, for example, a learned model is generated by performing machine learning with using voice related to the control-related word as an input and identification information of a process corresponding to the control-related word as supervised data. For example, the machine learning is performed with using a voice such as "stop video" as an input and identification information of a corresponding process that stops video recording as supervised data. In this voice recognition process, a probability that a control-related word (a wake word or a control word) is included in an input audio signal may be output from the neural network. The system control unit 50 can edit video based on this probability. For example, when the probability is equal to or greater than a predetermined threshold value, the system control unit 50 may cut out data before the control-related word start time X or Y as a video file, and when the probability is less than the predetermined threshold value, the system control unit 50 may add reference information to a frame corresponding to the control-related word start time X or Y. With this arrangement, when there is a high probability that a control-related word will be included in an audio signal, an unnecessary part is automatically deleted, resulting in user's convenience being improved. On the other hand, when the probability that a control-related word will be included in an audio signal is not so high, reference information is added without auto deletion being performed, and this reduces incorrect deletion and enables the user to easily perform deletion later based on the reference information.

It should be noted that in order to execute the learned model generated by the neural network, machine power is required to a certain extent. Accordingly, for example, a process of the neural network may be executed by a server connected via Wi-Fi or Internet. That is, the digital camera 100 uploads an input voice to a server via the Wi-Fi or the Internet, and the server in turn performs voice recognition with using the neural network. Then, the system control unit 50 downloads identification information on a process, which is output as a recognition result. Thus, implementation using a learned model becomes possible even when the system control unit 50 lacks processing speed.

Moreover, voice recognition is used in scenes where a user speaks to a device, it is preferred that the time from uttering of a voice by the user to execution of a process is as short as possible. Accordingly, a wake word may be recognized by the digital camera 100, and voice commands following the wake word may be recognized by the server. This can reduce the amount of data to be uploaded to the server, and hence the time required for uploading can be shortened. It should be noted that when a wake word is determined in advance, the number of layers in a neural network can be decreased as compared to a neural network which recognizes voice commands. Therefore, the digital camera 100 can be configured to execute a learned model constructed by the neural network.

In the embodiment described above, the system control unit 50 carries out various types of control processes. These control processes may be carried out by a single piece of hardware or may be carried out by multiple pieces of hardware (for example, a plurality of processors or circuits) on a sharing basis. Moreover, the processing on a neural network described above may be implemented by, for example, a GPU (Graphics Processing Unit).

In the embodiment described above, the digital camera 100 is illustrated as the image pickup apparatus according to the present invention. The present invention, however, may be applied to arbitrary equipment having the image pickup unit and the audio input unit. For example, the present invention may be applied to equipment such as a personal computer, a PDA, a mobile phone terminal, a game machine, and a voice recognition device.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-043327 filed on Mar. 12, 2020 which is hereby incorporated by reference herein in its entirety.

What is claimed is:

1. An image pickup apparatus comprising:
an image pickup unit that obtains video;
an audio input unit that collects sound; and
a control unit that controls recording of the video based on a wake word and a control word included in the sound collected by the audio input unit,
wherein in a case where the control word that gives an instruction to stop recording the video is included in the sound, the control unit stops recording the video and records video data before a start time of the wake word as a video file.

2. The image pickup apparatus according to claim 1, wherein
setting the wake word for stopping recording the video by a user is allowable, and
switching, by the user, between a setting that records the video data before the start time of the wake word as the video file, and a setting that records the video data before the start time of the control word as the video file is allowable.

3. The image pickup apparatus according to claim 1, wherein
setting the wake word and the control word for stopping recording the video by a user is allowable, and
switching, by the user, between a setting that records the video data before the start time of the wake word as the video file, and a setting that records the video data before a time at which recording of the video was stopped as the video file is allowable.

4. The image pickup apparatus according to claim 1, wherein
switching, by a user, among a setting that records the video data before the start time of the wake word as the video file, a setting that records the video data before the start time of the control word as the video file, and a setting that records the video data before a time at which recording of the video was stopped as the video file is allowable.

5. An image pickup apparatus comprising:
an image pickup unit that obtains video;
an audio input unit that collects sound; and
a control unit that controls recording of the video based on a wake word and a control word included in the sound collected by the audio input unit,
wherein in a case where the control word that gives an instruction to stop recording the video is included in the sound, the control unit stops recording the video, adds reference information to a frame in the video data which corresponds to a start time of the wake word and records the video data as a video file.

6. The image pickup apparatus according to claim 5, wherein
setting the wake word for stopping recording the video by a user is allowable, and
switching, by a user, between a setting that records the video data in which the reference information was added to the frame corresponding to the start time of the wake word as the video file, and a setting that records the video data in which the reference information was added to the frame corresponding to the start time of the control word as the video file is allowable.

7. The image pickup apparatus according to claim 5, wherein
setting the wake word and the control word for stopping recording the video by a user is allowable, and
switching, by the user, between a setting that records the video data in which the reference information was added to the frame corresponding to the start time of the wake word as the video file, and a setting that records the video data as the video file without adding the reference information to the video data is allowable.

8. The image pickup apparatus according to claim 5, wherein switching, by a user, among a setting that records the video data in which the reference information was added to the frame corresponding to the start time of the wake word as the video file, a setting that records the video data in which the reference information was added to the frame corresponding to the start time of the control word as the video file, and a setting that record the video data as the video file without adding the reference information to the video data is allowable.

9. The image pickup apparatus according to claim 5, wherein
the control unit deletes the video data in the frame to which the reference information indicating the start time was added and the subsequent frames, from the video file.

10. An image pickup apparatus comprising:
an image pickup unit that obtains video;
an audio input unit that collects sound; and
a control unit that controls recording of the video based on a wake word and a control word included in the sound gathered by the audio input unit,
wherein in a case where the control word that gives an instruction to stop recording the video is included in the sound, switching between a setting that records the video data before a start time of the wake word as a video file and that stops the recording the video, and a setting that adds reference information in a frame in the video data which corresponds to the start time of the wake word, that records the video data as the video file and that stops the recording the video is allowable.

11. The image pickup apparatus according to claim 1, wherein
the control unit shifts to a state of being ready to receive the control word when the wake word is input via the audio input unit.

12. A control method for an image pickup apparatus including an image pickup unit that obtains video, and an audio input unit that collects sound, the control method comprising:
controlling recording of the video based on a wake word and a control word included in the sound collected by the audio input unit; and
in a case where the control word that gives an instruction to stop recording the video is included in the sound, recording video data before a start time of the wake word as a video file and stopping recording the video.

13. A control method for an image pickup apparatus including an image pickup unit that obtains video, and an audio input unit that collects sound, the control method comprising:
controlling recording of the video based on a wake word and a control word included in the sound collected by the audio input unit,
in a case where the control word that gives an instruction to stop recording the video is included in the sound, adding reference information to a frame in the video data which corresponds to a start time of the wake word, recording the video data as a video file and stopping the recording the video.

14. A control method for an image pickup apparatus including an image pickup unit that obtains video, and an audio input unit that collects sound, the control method comprising:
controlling recording of the video based on a wake word and a control word included in the sound collected by the audio input unit,
in a case where the control word that gives an instruction to stop recording the video is included in the sound, switching between a setting that records the video data before a start time of the wake word as a video file and that stops the recording, and a setting that adds reference information in a frame in the video data which corresponds to the start time of the wake word and that records the video data as the video file.

15. A non-transitory computer-readable storage medium storing a computer executable program that executes a control method for an image pickup apparatus including an image pickup unit that obtains video, and an audio input unit that collects sound, the control method comprising:
controlling recording of the video based on a wake word and a control word included in the sound collected by the audio input unit; and
in a case where the control word that gives an instruction to stop recording the video is included in the sound, recording video data before a start time of the wake word as a video file and stopping recording the video.

16. A non-transitory computer-readable storage medium storing a computer executable program that executes a control method for an image pickup apparatus including an image pickup unit that obtains video, and an audio input unit that collects sound, the control method comprising:
controlling recording of the video based on a wake word and a control word included in the sound collected by the audio input unit,
in a case where the control word that gives an instruction to stop recording the video is included in the sound, adding reference information to a frame in the video data which corresponds to a start time of the wake word, recording the video data as a video file and stopping the recording the video.

17. A non-transitory computer-readable storage medium storing a computer executable program that executes a control method for an image pickup apparatus including an image pickup unit that obtains video, and an audio input unit that collects sound, the control method comprising:
controlling recording of the video based on a wake word and a control word included in the sound collected by the audio input unit,
in a case where the control word that gives an instruction to stop recording the video is included in the sound, switching between a setting that records the video data before a start time of the wake word as a video file and that stops the recording, and a setting that adds reference information in a frame in the video data which corresponds to the start time of the wake word and that records the video data as the video file.

* * * * *